(12) United States Patent
Hwang et al.

(10) Patent No.: US 11,238,182 B2
(45) Date of Patent: Feb. 1, 2022

(54) ELECTRONIC DEVICE WITH DISPLAY PANEL COPY PROTECTION MODULE AND METHOD FOR DETERMINING DUPLICATE DISPLAY PANEL

(71) Applicant: Samsung Display Co., Ltd., Yongin-si (KR)

(72) Inventors: Moon Sang Hwang, Yongin-si (KR); Weon Jun Choe, Yongin-si (KR); Deok Jun Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/886,491

(22) Filed: May 28, 2020

(65) Prior Publication Data

US 2020/0401732 A1 Dec. 24, 2020

(30) Foreign Application Priority Data

Jun. 19, 2019 (KR) .......................... 10-2019-0073083

(51) Int. Cl.
*G06F 21/73* (2013.01)
*G06F 7/58* (2006.01)
*G06F 3/041* (2006.01)
*G06F 21/45* (2013.01)
*G09G 3/20* (2006.01)

(52) U.S. Cl.
CPC ............ *G06F 21/73* (2013.01); *G06F 3/0416* (2013.01); *G06F 7/582* (2013.01); *G06F 21/45* (2013.01); *G09G 3/20* (2013.01); *G09G 2370/042* (2013.01)

(58) Field of Classification Search
None
See application file for complete search history.

(56) References Cited

U.S. PATENT DOCUMENTS

| 5,652,845 | A | 7/1997 | Arai et al. | |
| 9,727,207 | B2* | 8/2017 | Dunn | G06F 3/1454 |
| 10,339,375 | B2* | 7/2019 | Castillo | G06F 40/295 |
| 2017/0346672 | A1* | 11/2017 | Li | H04L 67/02 |
| 2019/0082968 | A1* | 3/2019 | Karnik | G06F 3/016 |

FOREIGN PATENT DOCUMENTS

| KR | 10-0281566 B1 | 2/2001 |
| KR | 20-0369764 Y1 | 12/2004 |
| KR | 10-0906404 B1 | 7/2009 |

* cited by examiner

*Primary Examiner* — Duane N Taylor, Jr.
(74) *Attorney, Agent, or Firm* — Lewis Roca Rothgerber Christie LLP

(57) ABSTRACT

A method for determining whether or not a display panel is a duplicate is provided. The method includes: generating, by a code generator in an electronic module, a code, the electronic module including a plurality of electronic components; transmitting, by the code generator, the code to each of a first sequence generator in the electronic module and a second sequence generator in a display panel, the display panel being configured to be mounted to the electronic module; generating, by the first sequence generator, a first response value, and transmitting the first response value to a certification component in the electronic module; generating, by the second sequence generator, a second response value, and transmitting the second response value to the certification component; and comparing, by the certification component, the received first response value and the received second response value.

12 Claims, 17 Drawing Sheets

ELECTRONIC DEVICE WITH DISPLAY PANEL COPY PROTECTION MODULE AND METHOD FOR DETERMINING DUPLICATE DISPLAY PANEL

CROSS-REFERENCE TO RELATED APPLICATION

The present application claims priority to and the benefit of Korean Patent Application No. 10-2019-0073083 filed on Jun. 19, 2019 in the Korean Intellectual Property Office, the entire disclosure of which is incorporated herein by reference.

BACKGROUND

1. Field

Aspects of embodiments of the present disclosure generally relate to electronic devices with a copy protection module and a method for determining a duplicate display panel.

2. Description of the Related Art

A display device may be manufactured by mounting a display panel in an electronic module. To prevent problems caused when an unauthorized (e.g., counterfeit) display panel, such as an unauthorized third-party replacement display panel, is connected to an application processor in an electronic module, the electronic module may read a product identification code stored in a nonvolatile memory when the electronic module operates to operate the display panel only when the product identification code accords with (or corresponds to) an identification code of a genuine (e.g., authorized) display panel.

However, when a display device uses a method of reading an identification code recorded in (or stored in) a display panel, the identification code may be detected (e.g., learned) by observing an interface signal between an electronic module and the display panel. For example, in the case of a portable mobile device, an identification code may be detected by observing a Mobile Industry Processor Interface (MIPI) interface signal by using a high-speed signal analysis system.

SUMMARY

Embodiments of the present disclosure provide a method for determining duplication of a display panel (e.g., determining whether or not a display panel is authorized) such that it is difficult (or virtually impossible) for an external user to infer the code (e.g., the identification code).

Embodiments of the present disclosure also provide an electronic device including a display panel copy protection module that employs a method making it difficult (e.g., virtually impossible) to infer the code.

According to an embodiment of the present disclosure, a method for determining whether or not a display panel is a duplicate is provided. The method includes: generating, by a code generator in an electronic module, a code, the electronic module including a plurality of electronic components; transmitting, by the code generator, the code to each of a first sequence generator in the electronic module and a second sequence generator in a display panel, the display panel being configured to be mounted to the electronic module; generating, by the first sequence generator, a first response value, and transmitting the first response value to a certification component in the electronic module; generating, by the second sequence generator, a second response value, and transmitting the second response value to the certification component; and comparing, by the certification component, the received first response value and the received second response value.

The first sequence generator and the second sequence generator may generate the first response value and the second response value by using a linear feedback shift register (LFSR).

Each item of a sequence generated by using the LFSR may be a binary number having at least 16 bits.

The code may include a seed and a number value.

A first item of the sequence generated by using the LFSR may be generated by moving, to a first cipher of the seed, an output value obtained by inputting two ciphers selected from the seed to an exclusive OR gate, and deleting the last cipher of the seed.

The first response value and the second response value may correspond to an item selected according to the number value from among the items of the sequence generated by using the LFSR.

Each of the first sequence generator and the second sequence generator may include a multiplexer.

The multiplexer may output a j-bit binary item by selecting at least two ciphers from an i-bit binary item, in which i is a natural number greater than or equal to 2, and j is smaller than i.

The code generator and the first sequence generator may be in a processor of the electronic module, and the second sequence generator may be in a driver integrated circuit (IC) of the display panel.

The processor may be configured to control the driver IC electrically connected thereto.

In the comparing, by the certification component, the received first response value and the received second response value, the processor may control the display panel to be operated when the first response value and the second response value are equal to each other, and may control the display panel to not be operated when the first response value and the second response value are different from each other.

The method may further include, between the transmitting of the code and the transmitting of the first response value, generating, by the second sequence generator, a password, and transmitting the password to the first sequence generator.

The code generator may be configured to generate the code based on a GPS coordinate, a current time, a current data, or a one-time pad (OTP).

According to another embodiment of the present disclosure, an electronic device includes a processor for transmitting and receiving an electrical signal to and from a display panel. The processor includes: a code generator configured to generate a code and to transmit the code to the display panel; a first sequence generator configured to output a first response value from the code by using a linear feedback shift register (LFSR); and a certification component configured to receive a second response value from the display panel and to compare the first response value and the second response value.

The display panel may include: an interface in the electronic device to transmit and receive the electrical signal; and a second sequence generator configured to output the second response value from the code by using a LFSR.

The display panel may be mounted in the electronic device.

The electronic device may further include a power supply, a camera, a sensor, and a speaker, and the power supply, the camera, the sensor, and the speaker may be configured to be controlled by the processor.

According to another embodiment of the present disclosure, a display panel includes: a power controller; a touch signal controller; a driver IC configured to control the power controller and the touch signal controller; and a second sequence generator in one of the power controller, the touch signal controller, and the driver IC. The second sequence generator is configured to generate a pseudo random number and to transmit the pseudo random number to an external electronic device.

The pseudo random number may be generated based on a code received from the external electronic device.

The display panel may further include an interface through which the driver IC is electrically connected to a processor of the external electronic device, the interface may be in the external electronic device.

BRIEF DESCRIPTION OF THE DRAWINGS

Example embodiments of the present disclosure will now be described more fully hereinafter with reference to the accompanying drawings; the present disclosure, however, may be embodied in different forms and should not be construed as limited to the example embodiments set forth herein. Rather, these embodiments are provided so that this disclosure will be thorough and complete and will fully convey the scope of the present disclosure to those skilled in the art.

In the drawings, dimensions may be exaggerated for clarity of illustration, and like reference numerals refer to like elements throughout.

DETAILED DESCRIPTION

Figure 1:
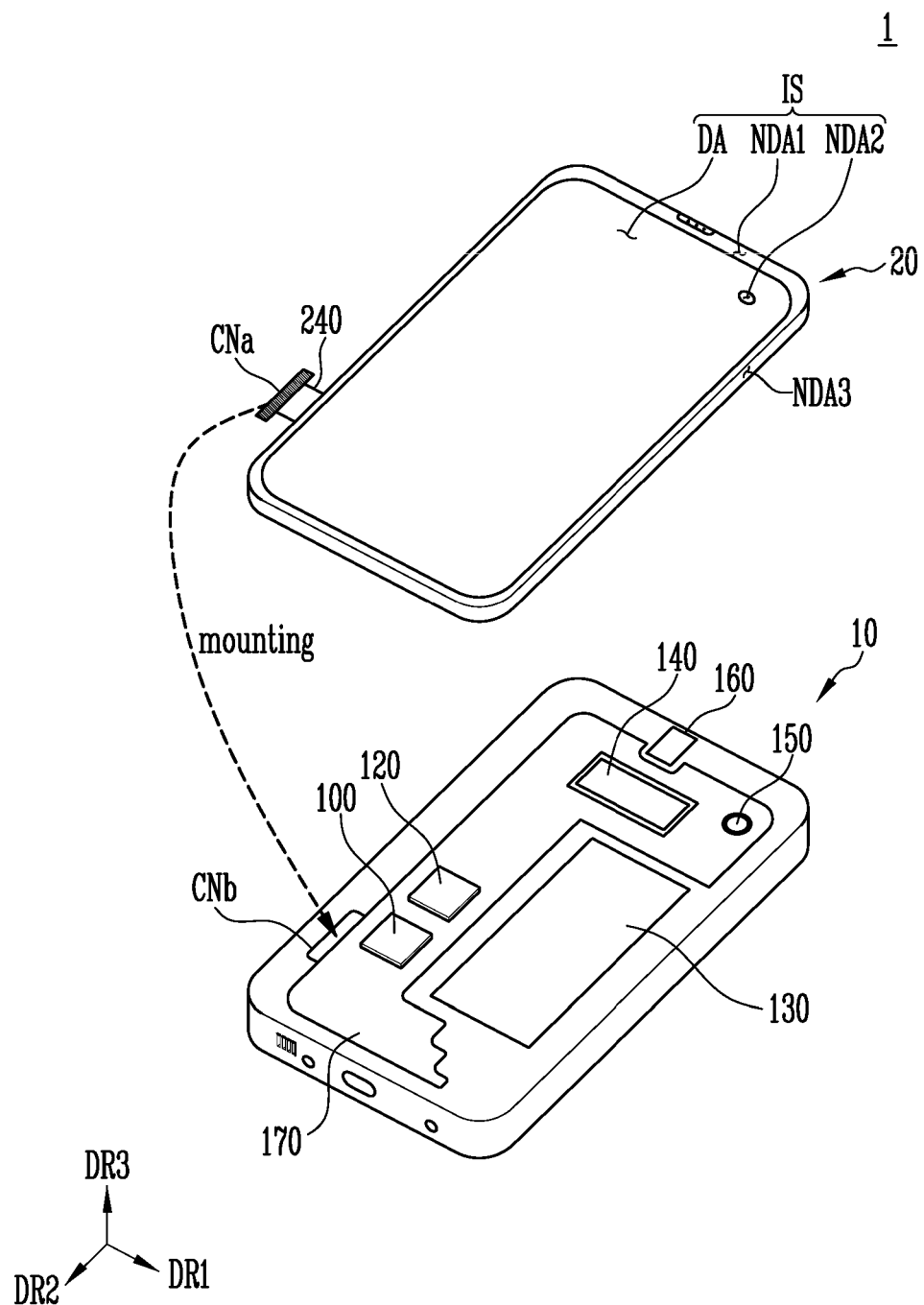
FIG. 1 is an exploded perspective view schematically illustrating an electronic device according to an embodiment of the present disclosure.

Example embodiments will now be described more fully hereinafter with reference to the accompanying drawings; the present disclosure, however, may be embodied in different forms and should not be construed as limited to the example embodiments set forth herein. Rather, these embodiments are provided so that this disclosure will be thorough and complete and will fully convey the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the entire description of the present disclosure, the same drawing reference numerals are used for the same elements across various figures. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

Although the terms "first," "second," and the like are used for describing various components, these components are not confined by these terms. These terms are merely used for distinguishing one component from the other components. Therefore, a first component may be a second component or vice versa according to the technical concepts of the present disclosure.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, exemplary embodiments will be described with reference to the accompanying drawings.

Figure 2:
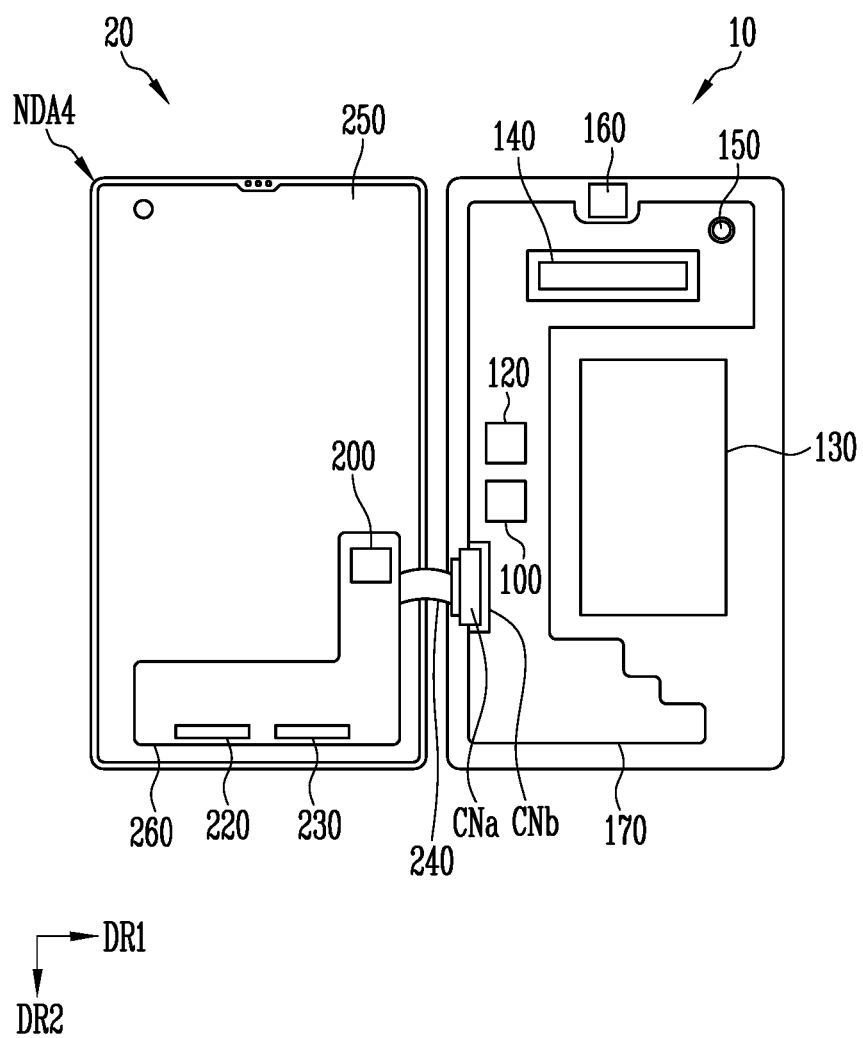
FIG. 2 is a plan view illustrating a display panel of the electronic device shown in FIG. 1 in an unfolded state and connected to an electronic module.

FIG. 1 is an exploded perspective view schematically illustrating an electronic device according to an embodiment of the present disclosure, and FIG. 2 is a plan view illustrating a display panel of the electronic device shown in FIG. 1 in an unfolded state and connected to an electronic module. FIG. 2 shows a rear surface of the display panel and a rear surface of the electronic module.

Referring to FIGS. 1 and 2, the electronic device 1 includes a display panel 20 and an electronic module 10 accommodating the display panel 20.

Hereinafter, a display device, such as a smart phone, including the display panel 20 will be described as an example of the electronic device 1. However, the present disclosure may be applied to any suitable display device as long as the display device is an electronic device to which a display panel is connected, such as a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, a television, or a wearable device. In an embodiment, the display panel 20 may be integrally mounted in the electronic module 10 and may be configured to perform functions of the display device.

Examples of the display panel 20 include an organic light emitting diode (OLED) display panel, a liquid crystal display (LCD) panel, a plasma display panel (PDP), an electrophoretic display panel, a microelectromechanical system (MEMS) display panel, an electrowetting display panel, and the like.

The electronic device 1 may display an image on a display surface IS of the display panel 20. In the illustrated embodiment, the display surface IS is a front surface of the display panel 20 and has a planar shape defined by a first direction DR1 and a second direction DR2 crossing (e.g., perpendicular to) the first direction DR1. However, this is merely illustrative. In another embodiment, the display surface IS may have a curved (e.g., bent or folded) shape.

A normal direction of the display surface IS (e.g., a thickness direction of the display panel 20) is indicated by a third direction DR3. A front surface (or top surface) and a rear surface (or bottom surface) of each member of the electronic device 1 is distinguished by the third direction DR3. However, the directions indicated by the first to third directions DR1, DR2, and DR3 are relative concepts and may be suitably changed or varied. The display surface IS includes a display area DA at where an image is displayed and non-display areas NDA1 to NDA4 adjacent to the display area DA. The non-display areas NDA1 to NDA4 are areas in which an image is not displayed.

In an embodiment, the display area DA may have a quadrangular shape with rounded corners. The first non-display area NDA1 is disposed to surround (e.g., may extend around a periphery of) the display area DA. In addition, the second non-display area NDA2 may be disposed at least partially in the display area DA. In addition, other surfaces of the display panel 20 (e.g., side and rear surfaces of the display panel 20) other than the display surface IS may be (or may include or may only include) the third and fourth non-display areas NDA3 and NDA4. However, the present disclosure is not limited thereto, and the shape of the display area DA and the shapes of the non-display areas NDA1 to NDA4 may be relatively designed (e.g., suitably modified or varied). In some embodiments, the non-display areas NDA1 to NDA4 may not be present on the display surface IS of the display panel 20, and the display area DA may be present (e.g., may extend onto or may also be present) on a side surface of the display panel 20.

Referring to FIG. 2, which shows the rear surface of the display panel 20, a driving integrated circuit 260 may be mounted in a Chip-On-Glass (COG) form on the display panel 20. For example, the driving integrated circuit 260 may be mounted on a glass substrate of the display panel 20 by interposing an Anisotropic Conductive Film (ACF) between the driving integrated circuit 260 and the glass substrate of the display panel 20 and then compressing the ACF at high temperature.

In an embodiment, the driving integrated circuit 260 may include a driver IC 200. In some embodiments, the driving integrated circuit 260 may be connected to the driver IC 200 and may include a source driver integrated circuit configured to apply a data voltage to the display area DA of the display panel 20, a scan driver integrated circuit configured to apply a gate voltage to the display area DA of the display panel 20, and/or a combined driver integrated circuit in which both the source driver and the scan driver are integrated.

Also, in an embodiment, the driving integrated circuit 260 may include a power controller 220 and a touch signal controller 230. The power controller 220 may be configured to control the data voltage and the gate voltage. The touch signal controller 230 is an input device of the electronic device 1 and may function to calculate a touch coordinate by transmitting a driving signal to a touch sensing unit and receiving a sensing signal.

Although one driving integrated circuit 260 is mounted on the display panel 20 in the embodiment illustrated in FIG. 2, the present disclosure is not limited thereto. In some embodiments, a plurality of driving integrated circuits 260 may be mounted on (or in) the display panel 20. In addition, the present disclosure is not limited to the arrangement structure shown in the drawings and may be suitably, variously modified.

Also, in an embodiment, an interface 240 configured to transmit/receive an electrical signal between the driving integrated circuit 260 and a processor 100 of the electronic module 10 may be mounted at the rear surface of the display panel 20. The driver IC 200 in the display panel 20 may transmit/receive an electrical signal to/from the processor 100 in the electronic module 10 through the interface 240.

In an embodiment, the interface 240 may be a Film-On-Glass (FOG) flexible printed circuit. For example, the interface 240 may be mounted on the glass substrate of the display panel 20 by interposing an Anisotropic Conductive Film (ACF) between the interface 240 and the glass substrate of the display panel 20 and then compressing the ACF at high temperature. The interface 240 may be connected to the electronic module 10, which transmits a data signal including image data and control data to control an operation of the display panel 20 when the display panel 20 is driven.

In an embodiment, an insulating pad 250 is disposed on (e.g., may be mounted at) the rear surface of the display panel 20 in most of the areas except where the driving integrated circuit 260 is disposed. The insulating pad 250 may prevent (or substantially prevent) an electrical or magnetic interference signal generated in the electronic module 10 from being transferred to the display panel 20.

The display panel 20 may be mounted in (or on) the electronic module 10. A first connector CNa may be at one end of the interface 240, and a second connector CNb may be at (e.g., formed in a partial area of) a printed circuit board 170 of the electronic module 10. The first connector CNa and the second connector CNb may be connected to each other.

The electronic module 10 may include various suitable electronic components. The electronic components may include, for example, the printed circuit board 170, a power supply 130, a camera 140, a sensor 150, and a speaker 160. The sensor 150 may correspond to an illumination sensor, a proximity sensor, a heart rate sensor, an ultraviolet sensor, or the like. Further, the arrangement of the electronic components in the electronic module 10 is not limited to the arrangement shown in the drawings. In other embodiments, some of the above-described electronic components may be omitted, and one or more components performing other (e.g., the same or different) functions may be added. That is, the electronic module 10 may be implemented in various suitable forms without departing from the scope of the present disclosure.

In an exemplary embodiment, the processor 100 and a memory 120 may be mounted on the printed circuit board 170 in the electronic module 10.

The processor 100 may be configured execute specific calculations or tasks. For example, the processor 100 may be a mobile SoC (System-on-a-Chip), an application processor, a media processor, a microprocessor, a central processing unit (CPU), or a similar device.

The processor 100 may be connected to the memory 120 through a bus, such as an address bus, a control bus, and/or a data bus.

The memory 120 may be Dynamic Random Access Memory (DRAM), mobile DRAM, Static Random Access Memory (SRAM), Parameter Random Access Memory (PRAM), Ferroelectric Random Access Memory (FRAM), Resistive Random Access Memory (RRAM), Magnetic Random Access Memory (MRAM), or flash memory.

The processor 100 may control various electronic components in the electronic device 1, such as the power supply 130, the camera 140, the sensor 150, and the speaker 160.

The processor 100 may also be connected to an extended bus, such as a Peripheral Component Interconnect (PCI) bus. Accordingly, the processor 100 may control an input/output device including one or more input device(s), such as the touch sensing unit in the display panel 20, and one or more output device(s), such as the display panel 20. For example, the processor 100 may control the driver IC 200 that controls the input/output device of the display panel 20, which is a peripheral component, through the extended bus, such as the interface 240.

The processor 100 may determine whether or not the display panel 20 connected to the electronic module 10 is an unauthorized (e.g., unauthorized replacement or counterfeit) display panel. For example, when the display panel 20 is damaged due to an external impact or a defect, a user of the electronic device 1 may replace the display panel 20 in the electronic module 10 without replacing any other components thereof. The processor 100 in the electronic module 10 may determine whether or not the mounted display panel 20 is an unauthorized aftermarket screen.

The electronic device 1 may include duplicate determination modules (e.g., duplicate judging modules) 110 and 210 respectively included in the electronic module 10 and the display panel 20. Hereinafter, with reference to FIGS. 3-9, the determining whether or not the display panel 20 is an unauthorized display panel (hereinafter, the "unauthorized display panel" may be referred to as a "duplicate") will be described with reference to the electronic device 1 and to the duplicate determination modules 110 and 210. Like components shown in the drawings are designated by like reference numerals, and repeated descriptions thereof may be omitted.

Figure 3:
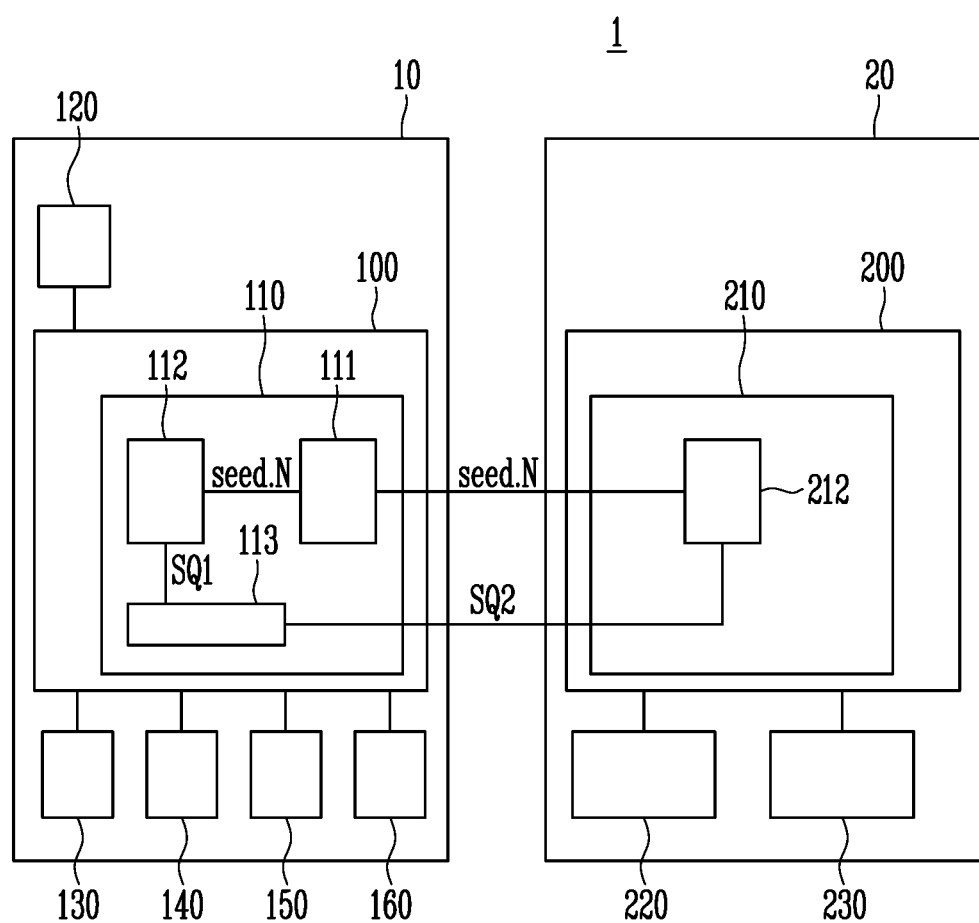
FIG. 3 is a block diagram schematically illustrating an electronic device according to an embodiment of the present disclosure.

FIG. 3 is a block diagram schematically illustrating the electronic device 1 according to an embodiment of the present disclosure.

Referring to FIG. 3, the electronic device 1 may have a first duplicate determination module 110 and a second duplicate determination module 210, which are respectively included in the electronic module 10 and the display panel 20.

The first duplicate determination module 110 may perform functions by using hardware and/or software in the processor 100 of the electronic module 10. Similarly, the second duplicate determination module 210 may perform functions by using hardware and/or software in the driver IC 200 of the display panel 20. An embodiment in which the duplicate determination modules 110 and 210 perform functions by using hardware is described below as an example.

The first duplicate determination module 110 may determine whether or not the display panel 20 is a duplicate by using one or more encryption algorithm(s) between (e.g., in a relationship between) the first duplicate determination module 110 and the second duplicate determination module 210. The encryption algorithm may include pseudo random numbers, an asymmetric encryption algorithm, a password hash function, a key exchange algorithm, a key derivation function, a secret sharing algorithm, symmetric encryption, any other suitable encryption algorithm, and/or any combination of suitable encryption algorithms. An embodiment in which duplication of the display panel 20 is determined by using a pseudo random number as the encryption algorithm will be described below.

The first duplicate determination module 110 may include a code generator 111, a first sequence generator 112, and a certification component 113. The second duplicate determination module 210 may include a second sequence generator 212.

In an embodiment, each sequence generator 112 and 212 may generate the pseudo random numbers.

The code generator 111 provides each sequence generator 112 and 212 with a seed for the pseudo random number generation encryption algorithm. Also, the code generator 111 may transmit, to each sequence generator 112 and 212, a number value N by which at least one of the generated pseudo random numbers is selected and output (the seed and number value N are shown together as seed·N in FIG. 3).

Each sequence generator 112 and 212 may generate a sequence of items, in which each item is an i-bit binary number (wherein i is a natural number greater than or equal to 2). In an exemplary embodiment, the i-bit binary number may have possible values, not including a zero (0) value. For example, a 4-bit binary number has 15 items (e.g., 15 possible values or nibbles)—0001, 0010, 0011, 0100, 0101, 0110, 0111, 1000, 1001, 1011, 1100, 1101, 1110, and 1111—when the zero (0000) value is omitted. The number of possible sequential arrangements of the 15 4-bit binary items generated by each sequence generator 112 and 212 is represented by 15!=1,307,674,368,000. Therefore, it can be seen that when each sequence generator 112 and 212 arranges items generated by using a 4- or greater-bit binary number in an arbitrary sequence, each sequence generator 112 and 212 generates pseudo random numbers.

In an embodiment, the seed generated by the code generator 111 may determine a first item from among the i-bit binary items generated by each sequence generator 112 and 212. Each sequence generator 112 and 212 may arrange the i-bit binary items by using an encryption algorithm. Also, each sequence generator 112 and 212 may select at least one of the arranged i-bit binary items as a response value SQ1 or SQ2 according to the number value N received from the code generator 111 and may output the response value SQ1 or SQ2.

For example, when an exemplary seed of 1010 is generated by the code generator 111 and transmitted to each sequence generator 112 and 212, each sequence generator 112 and 212 may generate a sequence of 1010, 1011, 0001, 0010, 0011, 1000, 1001, 0100, 0101, 0110, 0111, 1100, 1101, 1110, and 1111 from the seed by using an exemplary algorithm. In this example, 1010 corresponds to the seed, 1011 corresponds to a first item, 0001 corresponds to a second item, and 1111 corresponds to a fifteenth item, etc. Also, when the code generator 111 designates the number value N as 4, each sequence generator 112 and 212 may select 0011, i.e., the fourth item in the sequence, as the response value SQ1 or SQ2 and may output the response value SQ1 or SQ2.

Each of the response values SQ1 and SQ2, respectively output by the first sequence generator 112 and the second sequence generator 212, may be transmitted to the certification component 113. When the first sequence generator 112 outputs a first response value SQ1 and then transmits the first response value SQ1 to the certification component 113 and the second sequence generator 212 outputs a second response value SQ2 and then transmits the second response value SQ2 to the certification component 113, the certification component 113 may determine whether or not the received first response value SQ1 and the received second response value SQ2 are the same (e.g., are equal to each other). For example, when the response values SQ1 and SQ2, respectively received from the first sequence generator 112 and the second sequence generator 212, are the same, the certification component 113 may determine that the display panel 20 is not a duplicate (e.g., is an original display panel or is an authorized replacement). On the other hand, when the response values SQ1 and SQ2, which are respectively received from the first sequence generator 112 and the second sequence generator 212, are different from each other, the certification component 113 may determine that the display panel 20 is a duplicate (e.g., is an unauthorized replacement).

In an embodiment, the processor 100 may determine whether or not the display panel 20 is to be operated according to whether or not the display panel 20 is determined to be a duplicate or not a duplicate. For example, when the display panel 20 is determined to not be a duplicate, the processor 100 may control the display panel 20 to be operated (e.g., booted). And when the display panel 20 is determined to be a duplicate, the processor 100 may control the display panel 20 to not be operated (e.g., to not boot).

Next, a method for determining whether or not the display panel 20 of the electronic device 1 is a duplicate according to an embodiment of the present disclosure will be described in more detail.

Figure 4:
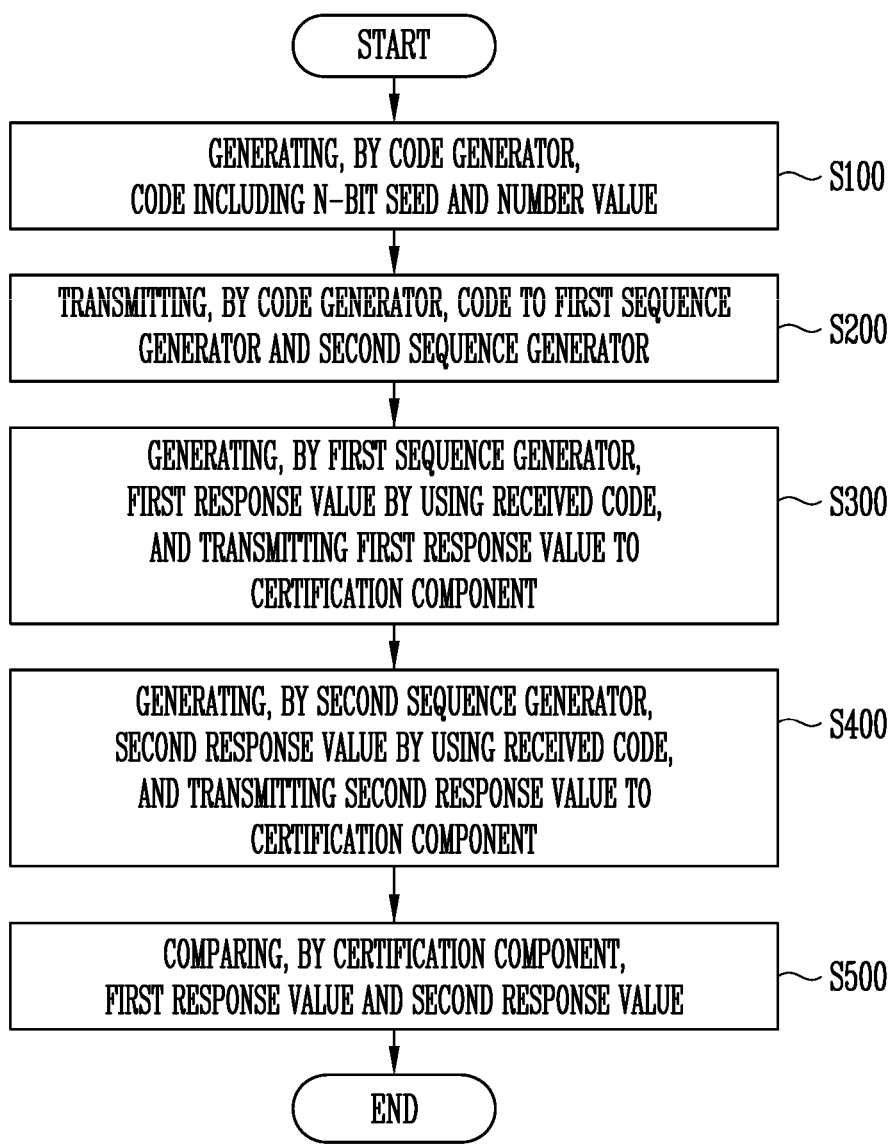
FIG. 4 is a flowchart illustrating a method for determining duplication of the display panel of the electronic device according to an embodiment of the present disclosure.

FIG. 4 is a flowchart illustrating a method for determining whether or not the display panel of the electronic device is a duplicate according to an embodiment of the present disclosure. FIGS. 5-9 are block diagrams illustrating respective steps of the method illustrated in FIG. 4.

Referring to FIG. 4, the method according to an embodiment of the present disclosure may include step S100 including generating a code, step S200 including transmitting the code, step S300 including generating and transmitting a first response value SQ1, step S400 including generating and transmitting a second response value SQ2, and step S500 including comparing the response values SQ1 and SQ2.

Although an embodiment in which the steps are sequentially performed according to the flowchart is described below, it will be apparent that some consecutive steps may be performed concurrently (or substantially simultaneously), the order of the steps may be changed, one or more step(s) may be omitted, or one or more additional step(s) may be further included between the described steps, without departing from the scope of the present disclosure.

Figure 5:
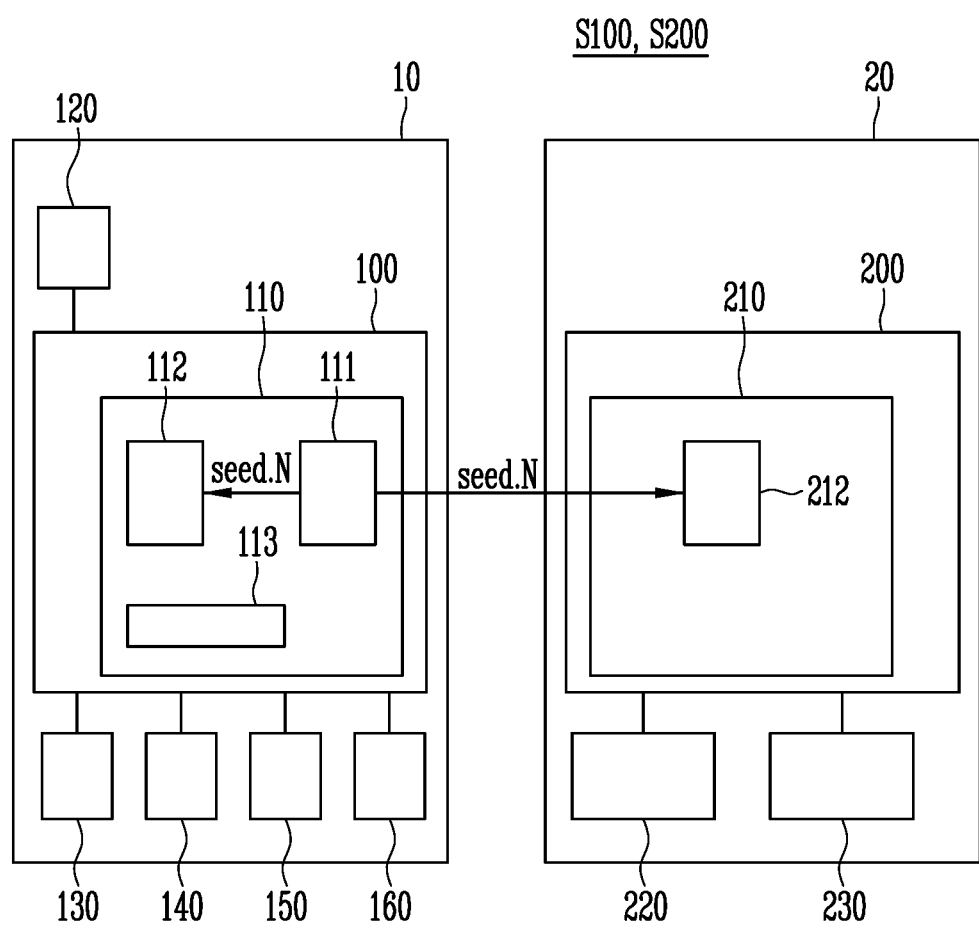
FIGS. 5-9 are block diagrams illustrating steps of the method illustrated in FIG. 4.

Referring to FIG. 5, together with FIG. 4, the step S100, in which the code generator 111 generates a code, and the step S200, in which the code generator 111 transmits the code, may be performed.

For example, the step S100, in which the code generator 111 generates a code, may correspond to a step in which the code generator 111 generates a code including an i-bit (wherein i is a natural number greater than or equal to 2) seed and a number value N as described above. In addition, the step S200, in which the code generator 111 transmits the code, may correspond to a step in which the code generator 111 transmits the code to the first sequence generator 112 and the second sequence generator 212 as described above.

In an embodiment, the first sequence generator 112 and the second sequence generator 212 may arrange i-bit binary items based on a linear feedback shift register (LFSR) structure as an algorithm. The arranged i-bit binary items may act as pseudo random numbers.

An LFSR is a type of shift register and has a structure in which a value input to a register is calculated as a linear function of previous state values. An exclusive logical sum (XOR) may be the primary function used in embodiments of the present disclosure. An initial value of the LFSR is referred to as a seed.

Because an operation of the LFSR is deterministic, a sequence of items generated by the LFSR is determined by a previous value thereof. In addition, because the number of items that belong to the register is finite, the sequence is iterated for a specific period. However, when a linear function is well-selected, a sequence that has a long period and seems to be random (e.g., has pseudo random numbers) may be generated. The LFSR is used in fields including pseudo random numbers, pseudo random noises, faster digital counters, cancellation sequences, etc.

The factor referred to as the number value N is used (e.g., is necessary or required) to determine an output value in the sequence determined by the seed (e.g., the initial value) of the LFSR. For example, after the seed and the number value N are determined (e.g., set or generated), the first sequence generator 112 may generate a first response value SQ1 according to the seed and the number value N, and the second sequence generator 212 may generate a second response value SQ2 according to the seed and the number value N. Therefore, the code generator 111 may generate a code including the seed and the number value N and may transmit the generated code to each of the first sequence generator 112 and the second sequence generator 212. In addition, each of the first sequence generator 112 and the second sequence generator 212 may receive the code including the seed and the number value N from the code generator 111.

Figure 6:
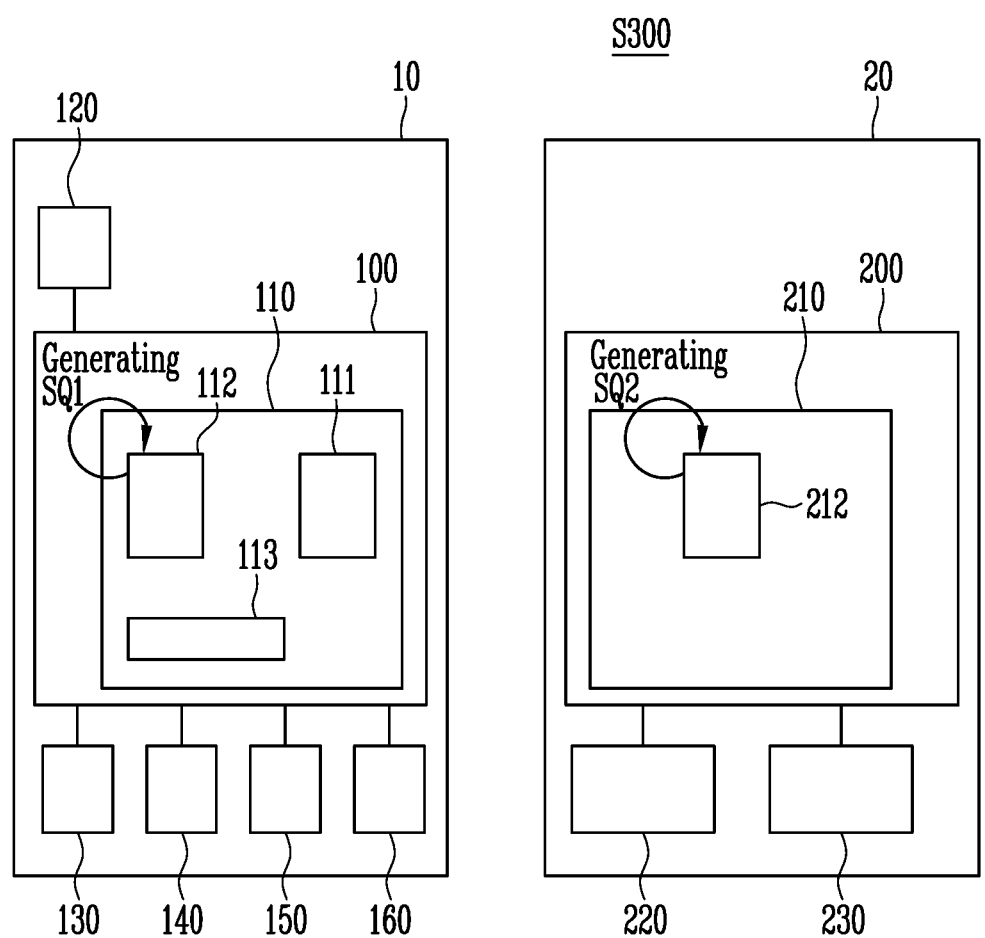
Figure 7:
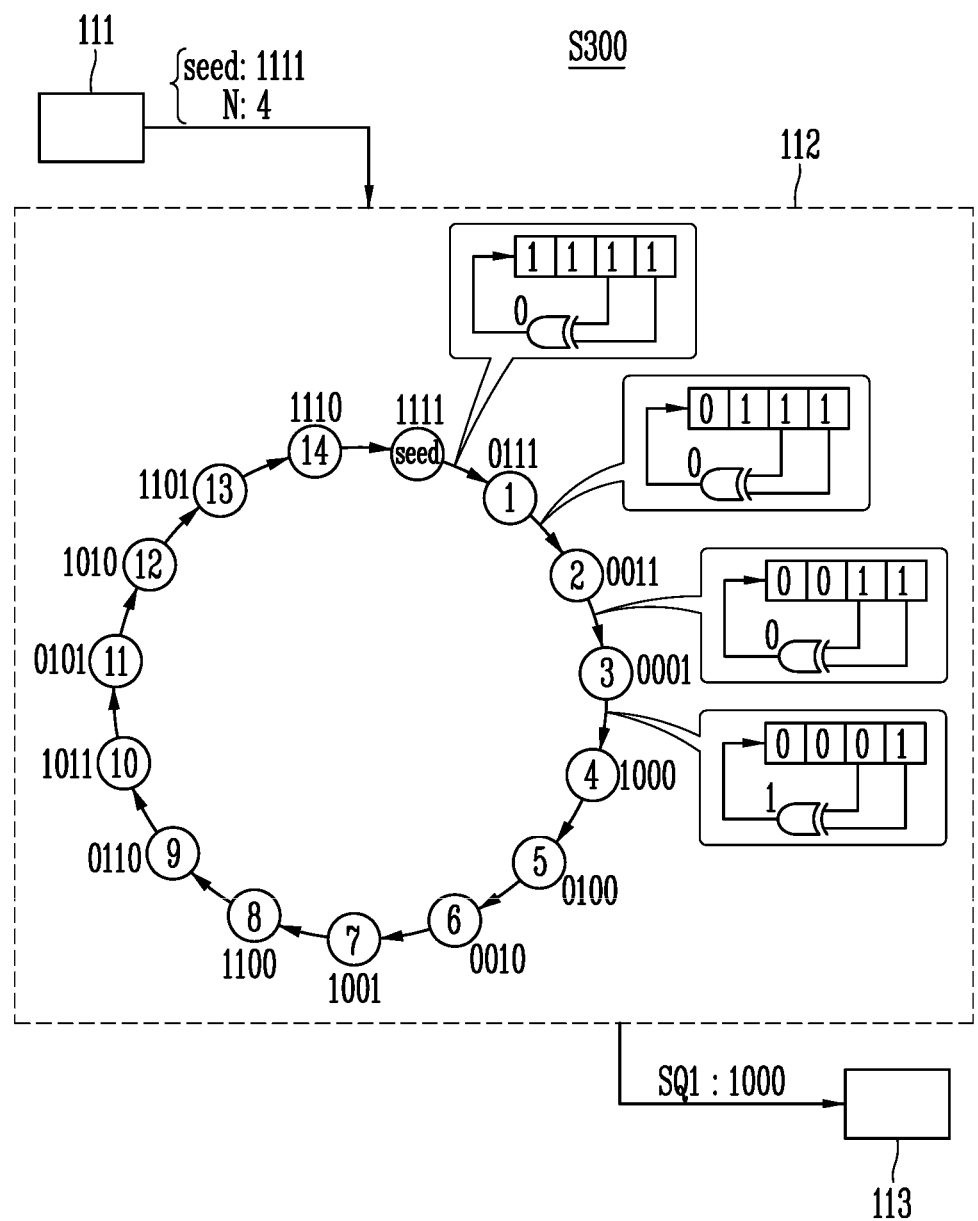
Figure 8:
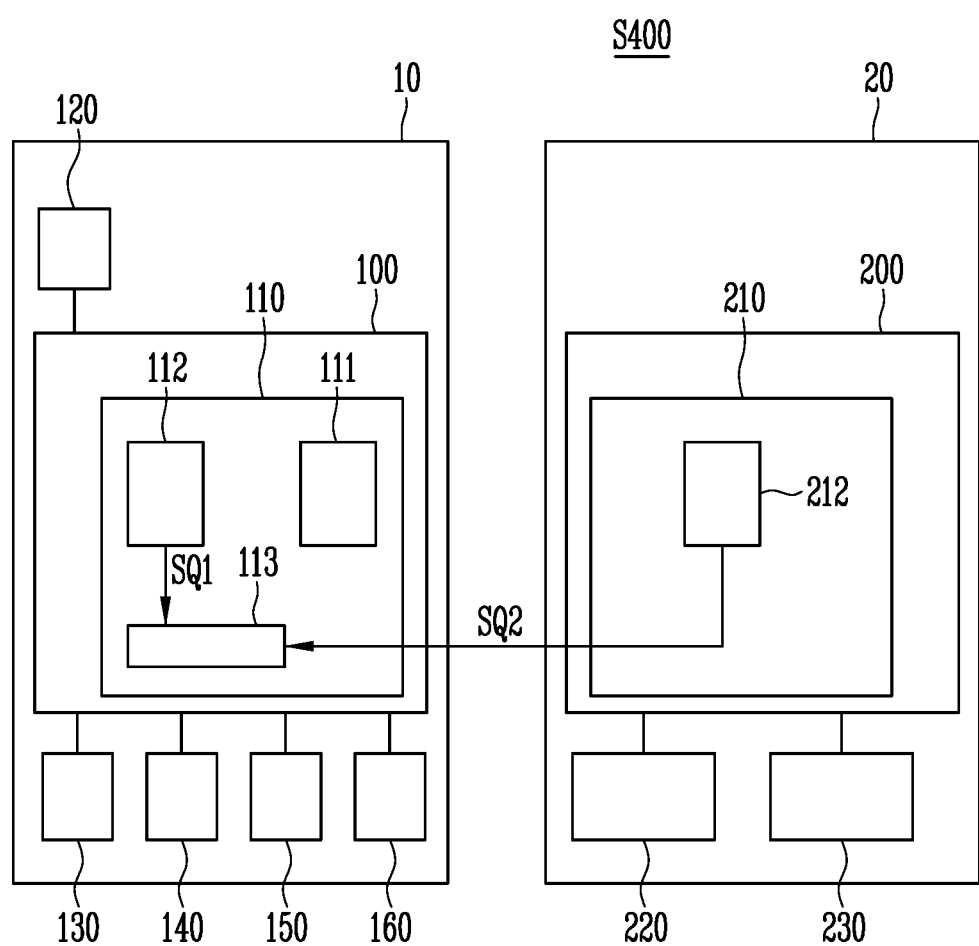

Next, referring to FIGS. 6-8, together with FIG. 4, the step S300 of generating and transmitting the first response value SQ1 and the step S400 of generating and transmitting the second response value SQ2 may be performed. In some embodiments, these two steps may be performed concurrently (e.g., may be performed substantially simultaneously), but the present disclosure is not limited thereto. FIG. 7 illustrates a process by which the first sequence generator 112 generates the first response value SQ1, and the second sequence generator 212 may use the same or substantially similar process to generate the second response value SQ2.

For example, the step S300 of transmitting the first response value SQ1 corresponds to a step in which the first sequence generator 112 generates the first response value SQ1 by using the received code and transmits the first response value SQ1 to the certification component 113 as described above. In addition, the step S400 of transmitting the second response value SQ2 corresponds to a step in which the second sequence generator 212 generates the second response value SQ2 by using the received code and transmits the second response value SQ2 to the certification component 113 as described above.

For example, when each sequence generator 112 and 212 arranges 4-bit binary items (or nibbles) through the LFSR and receives a code including an item of 1111 as the seed and 4 as the number value N from the code generator 111, each sequence generator 112 and 212 may generate a sequence of 15 4-bit binary items as follows.

First, a value of 0111 is generated as the first item by moving, to a first cipher of the seed, 0, which is an output value obtained by inputting two ciphers (e.g., the last two ciphers) of the seed (e.g., the initial value) 1111 to an exclusive OR (XOR) gate, and then deleting the last cipher. Subsequently, a value of 0011 is generated as the second item by moving, to the first cipher, 0, which is an output value obtained by inputting the last two ciphers of 0111 to the XOR gate, and then deleting the last cipher. Subsequently, a value of 0001 is generated as the third item by moving, to the first cipher, 0, which is an output value obtained by inputting the last two ciphers of 0011 to the XOR gate, and then deleting the last cipher. Subsequently, a value of 1000 is generated as the fourth item by moving, to the first cipher, 1, which is an output value obtained by inputting the last two ciphers of 0001 to the XOR gate, and then deleting the last cipher. In the same manner, a sequence having a total of 15 items is generated (e.g., the remaining 11 items are generated) by moving, to the first cipher of the seed, an output value obtained by inputting the last two ciphers to the XOR gate, and then deleting the last cipher.

When 4 is used as the number value N, each sequence generator 112 and 212 may output the fourth item (1000) as the first response value SQ1 and the second response value SQ2, and may transmit the fourth item (1000) to the certification component 113.

In the above example, another suitable value may be used as the seed, and a bit number of the LFSR may be suitably changed. A total number of variations with respect to the arrangement of items may be determined by multiplying a number of cases of the seed and a number of cases of the calculable number value N. For example, using a sequence of 4-bit binary items as an example, $(2^4-1)((2^4-1)=255$ sequence arrangements may be represented.

In some embodiments, a 16- or greater-bit LFSR may be used such that making an inference with respect to (e.g., guessing) the arrangement of items through iterative measurement is virtually impossible. When the 16-bit LFSR is used, $(2^{16}-1)(2^{16}-1)=4,294,836,255$ sequence arrangements may be represented. In addition, when a 32-bit LFSR is used, $(2^{32}-1)(2^{32}-1)=18,446,744,065,119,600,000$ sequence arrangements may be represented. For example, when the 16-bit LFSR is used, making an inference with respect to the arrangement of items through iterative measurement may be virtually impossible.

Figure 9:
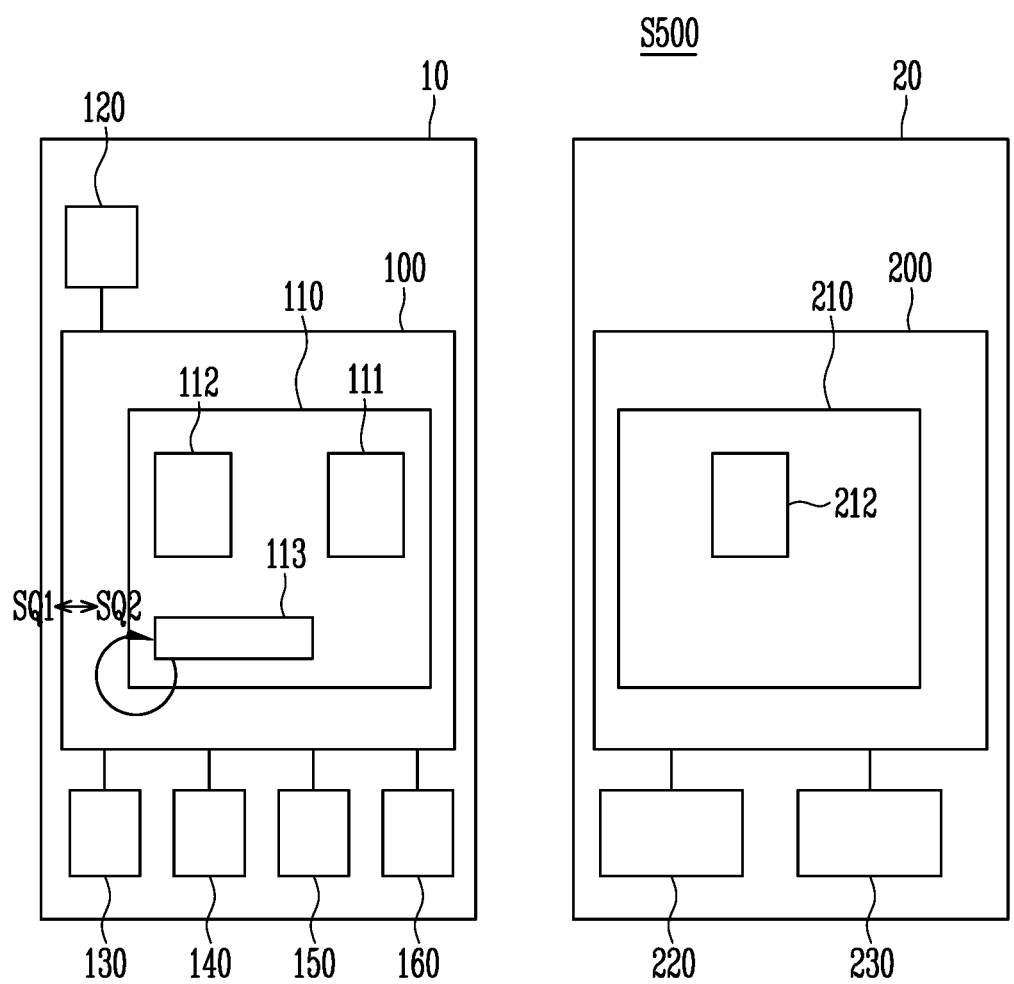

Next, referring to FIG. 9, together with FIG. 4, the step S500 of comparing the response values SQ1 and SQ2 may be performed.

For example, the step S500 of comparing the response values SQ1 and SQ2 corresponds to a step in which the certification component 113 compares the first response value SQ1 and the second response value SQ2 as described above.

The certification component 113 may compare a first sequence received from the first sequence generator 112 with a second sequence received from the second sequence generator 212. For example, when the first response value SQ1 and the second response value SQ2 are the same value of, for example, 1000, as the result of the above-described exemplary steps, the certification component 113 may transfer the value to the processor 100, and the processor 100, recognizing the matching (or equal) values, may transmit a command such that the display panel 20 to which the electronic module 10 is mounted operates.

Next, a method for determining whether or not the display panel 20 of the electronic device 1 is a duplicate according to another embodiment of the present disclosure will be described. Hereinafter, components identical or substantially similar to those described above with reference to FIGS. 1-9 are designated by like reference numerals, and repeated descriptions thereof may be omitted.

Figure 10:
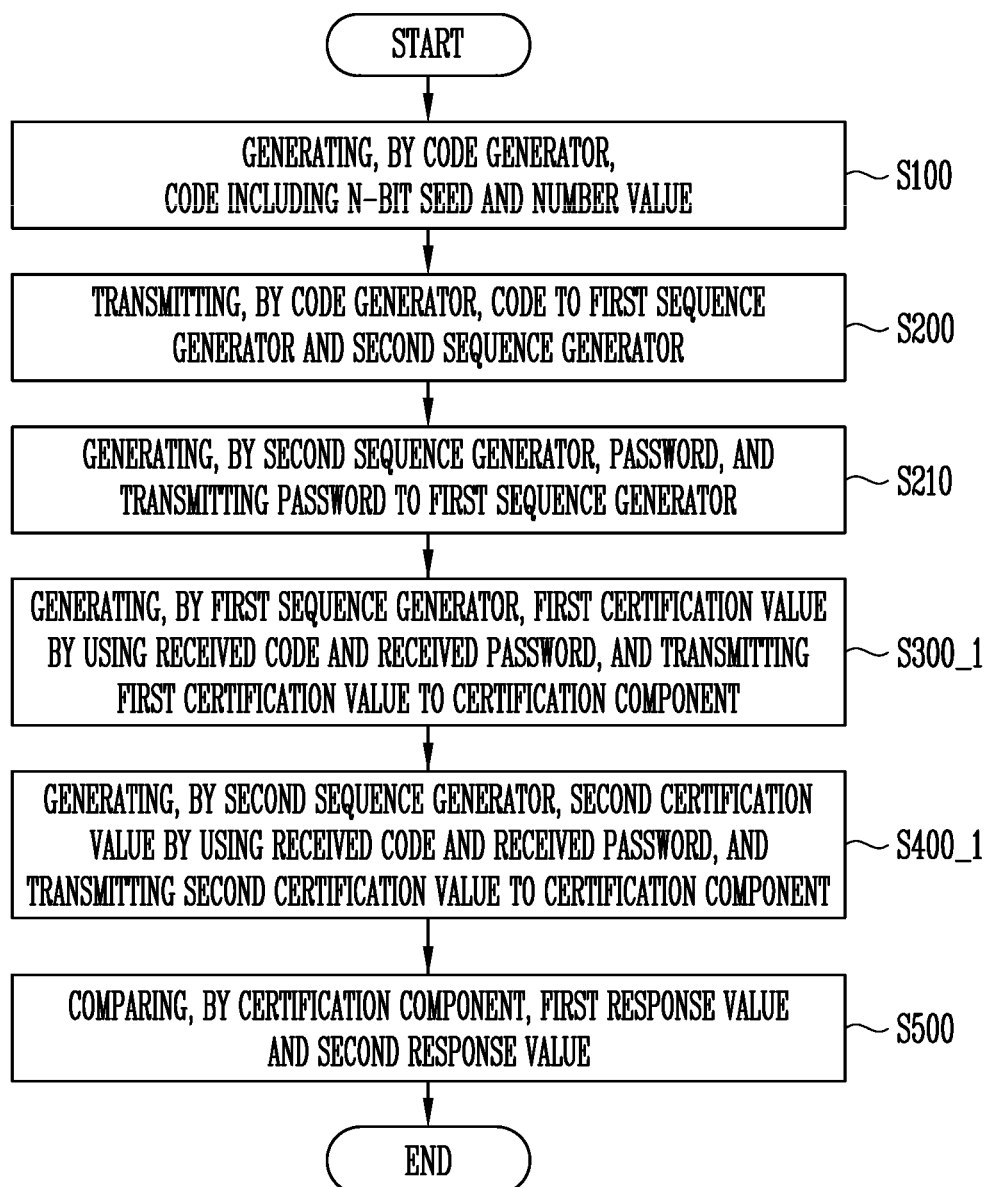
FIG. 10 is a flowchart illustrating a method for determining duplication of the display panel of the electronic device according to another embodiment of the present disclosure.

FIG. 10 is a flowchart illustrating a method for determining whether or not the display panel of the electronic device is a duplicate according to another embodiment of the present disclosure. FIGS. 11-14 are block diagrams illustrating some steps of the method illustrated in FIG. 10.

Referring to FIG. 10, the method according to this embodiment is different from the method according to the embodiment described above with reference to FIG. 4 in that the method illustrated in FIG. 10 further includes a step S210 of transmitting a password.

The method according to this embodiment may include the step S100 of generating a code, the step S200 of transmitting the code, the step S210 of generating and transmitting a password, the step S300_1 of generating and transmitting a first certification value SQ1, the step S400_1 of generating and transmitting a second certification value SQ2, and the step S500 of comparing the certification values SQ1 and SQ2. In this embodiment, each sequence generator 112 and 212_1 generates a certification value SQ1 or SQ2. The certification value SQ1 or SQ2 corresponds to a term corresponding to the response value SQ1 or SQ2 of the above-described embodiment, and accordingly, the same reference numeral is used.

Figure 11:
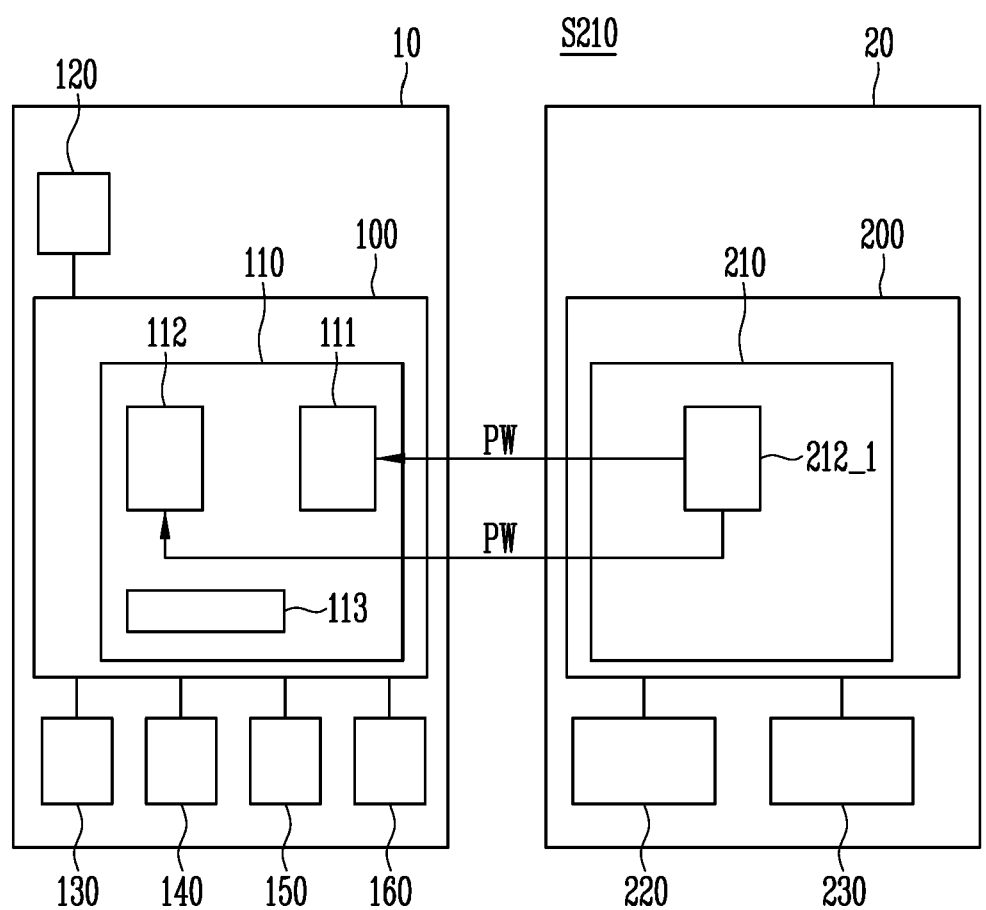
FIGS. 11-14 are block diagrams illustrating some steps of the method illustrated in FIG. 10.

Referring to FIG. 11, together with FIG. 10, the step S210 of generating and transmitting a password will be described. For example, the step S210 of generating and transmitting a password corresponds to a step in which a second sequence generator 212_1 generates a password PW and transmits the password PW to the first sequence generator 112.

In an embodiment, the second sequence generator 212_1 may generate a password PW. For example, the password PW may be used for a multiplexer MX (see, e.g., FIG. 13) of each sequence generator 112 and 212_1 to generate an encryption seed of a j-bit binary number (wherein j is a natural number that is less than i and greater than or equal to 2) by selecting a specific cipher from a seed of the j-bit binary number. The password PW may be previously shared between (e.g., may be previously stored in) the electronic module 10 and the display panel 20.

The second sequence generator 212_1 may transmit the generated password PW to the first sequence generator 112. The second sequence generator 212_1 may transmit the password PW directly to the first sequence generator 112 or may transmit the password PW through other components in the electronic module 10. In addition, the second sequence generator 212_1 may autonomously memorize (e.g., may store in a memory) the generated password PW.

Figure 12:
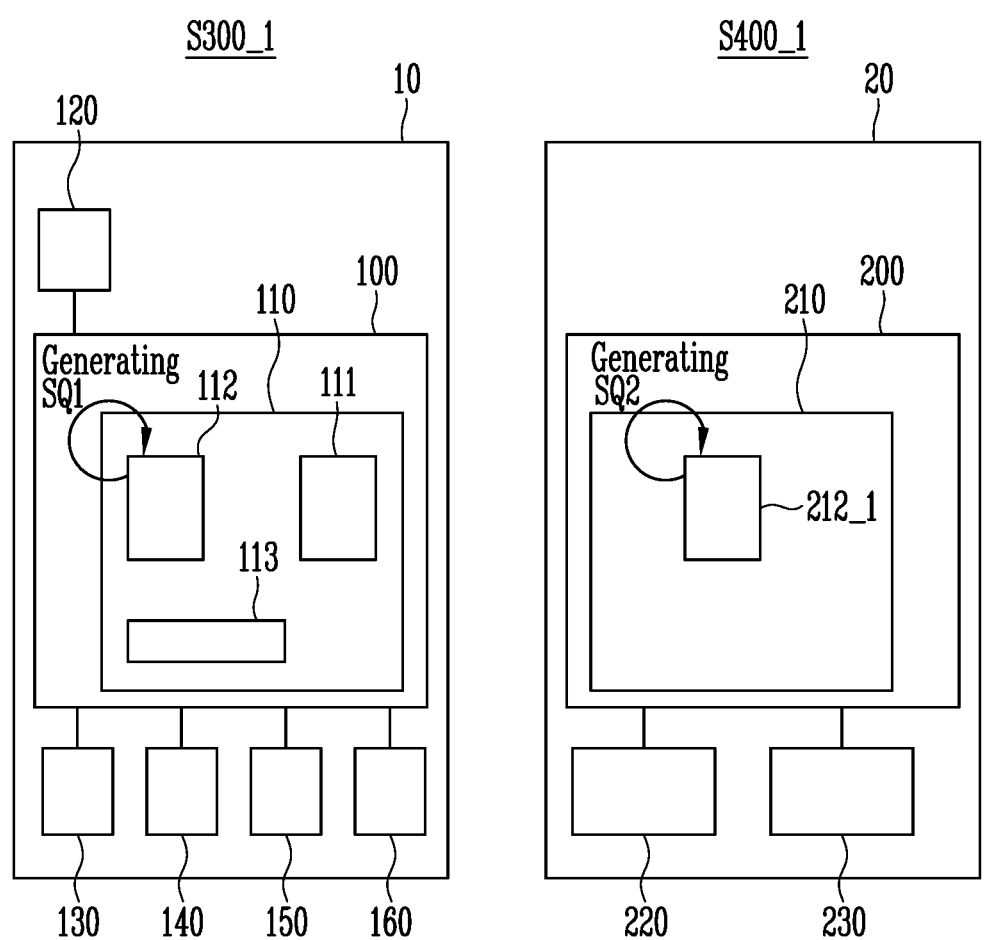
Figure 13:
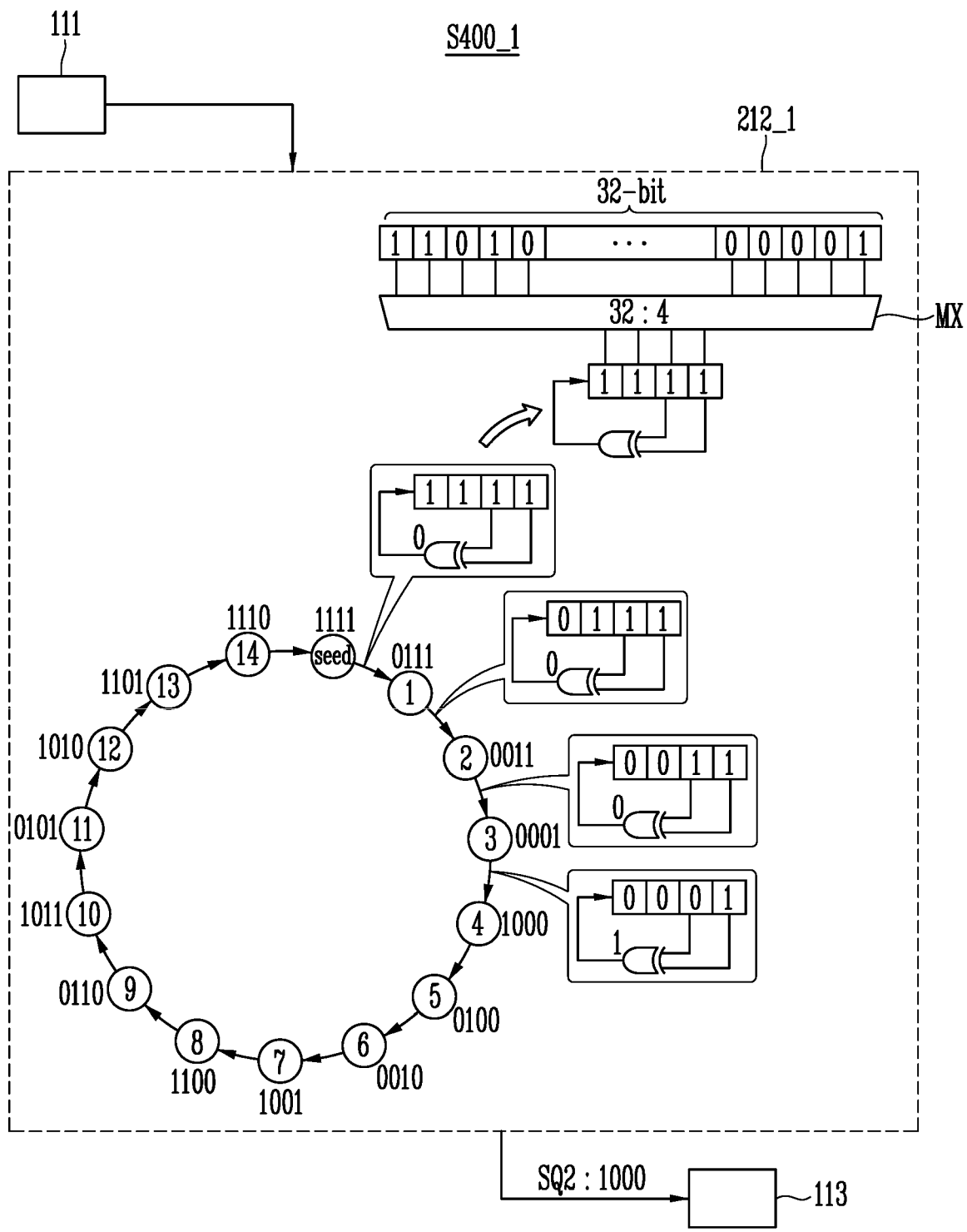
Figure 14:
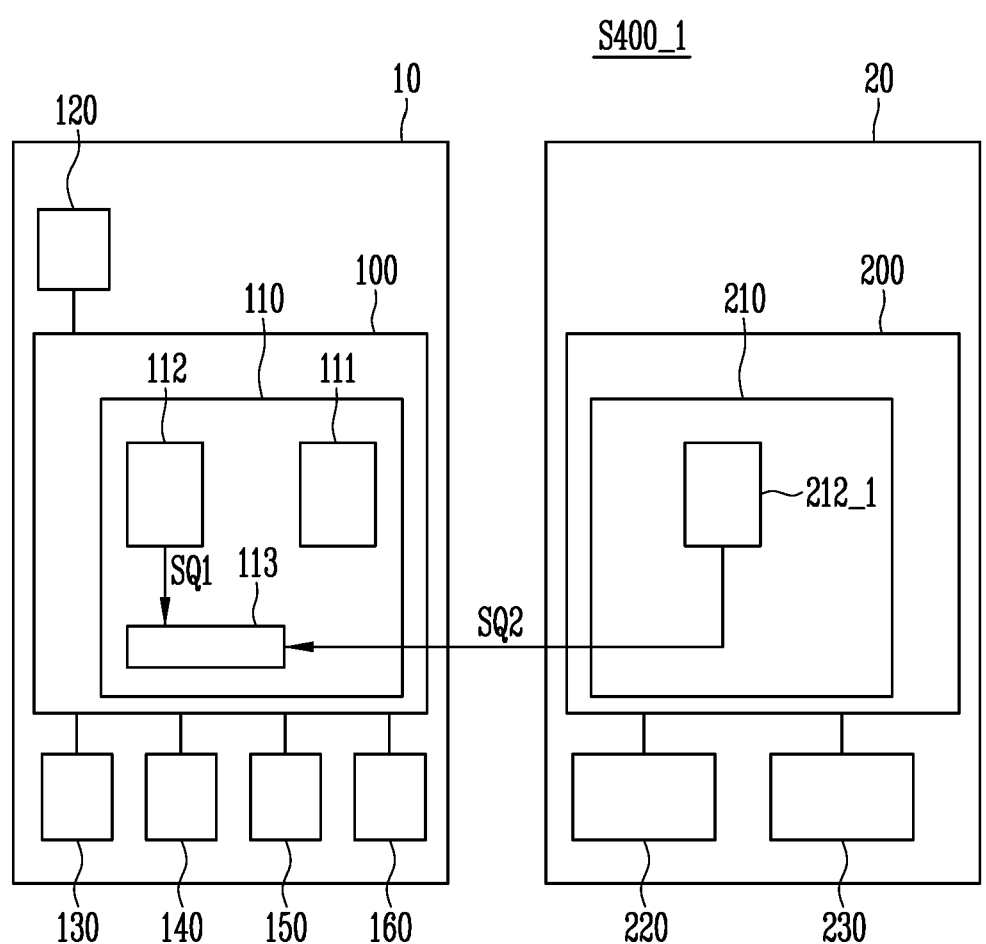

Next, referring to FIGS. 12-14, together with FIG. 10, the step S300_1 of generating and transmitting a first certification value SQ1 and the step S400_1 of generating and transmitting a second certification value SQ2 will be described. Although FIG. 13 illustrates a process in which the second sequence generator 212_1 generates the second certification value SQ2, and the process illustrated in FIG. 13 may also be applied to a process in which the first sequence generator 112 generates the first certification value SQ1.

For example, the step S300_1 of generating and transmitting a first certification value SQ1 corresponds to a step in which the first sequence generator 112 generates a first certification value SQ1 by using the received code and the received password PW and transmits the first certification value SQ1 to the certification component. In addition, the step S400_1 of generating and transmitting a second certification value SQ2 corresponds to a step in which the second sequence generator 212_1 generates a second certification value SQ2 by using the received code and the memorized (e.g., stored and/or received) password PW and transmits the second certification value SQ2 to the certification component 113. Hereinafter, an exemplary embodiment in which a 32-bit binary number is used as a seed will be described.

In an embodiment, each sequence generator 112 and 212_1 may include at least one multiplexer MX. For example, the multiplexer MX may generate a 4-bit binary encryption seed by selecting four ciphers from a 32-bit binary seed. However, it will be apparent that a bit number of the seed and a bit number of the encryption seed are not limited to the above-described example.

For example, first, the multiplexer MX of each sequence generator 112 and 212_1 may generate a 4-bit binary encryption seed by using a password PW generated by the second sequence generator 212_1 from a 32-bit binary seed received from the code generator 111. Next, each sequence generator 112 and 212_1 may arrange the 4-bit binary items by using the LFSR. For example, when each sequence generator 112 and 212_1 generates an item of 1111 as the encryption seed and receives a code of 4 as the number value N from the code generator 111, each sequence generator 112 and 212_1 may generate the same certification value SQ1 or SQ2 (e.g., 1000 as shown in FIG. 13).

The first certification value SQ1 and the second certification value SQ2, which are respectively generated by the first sequence generator 112 and the second sequence generator 212_1, may be transmitted to the certification component 113.

The step S500 of comparing the certification values SQ1 and SQ2 corresponds to a step in which the certification component 113 compares the received first certification value SQ1 and the received second certification value SQ2. The processor 100 may control the display panel 20 to be operated according to whether or not the first certification value SQ1 and the second certification value SQ2 are equal to (e.g., match) each other.

As described above, when each sequence generator 112 and 212_1 generates the certification value SQ1 or SQ2 through the multiplexer MX that extracts a j-bit binary number by using the previously shared password PW and the password PW, it is virtually impossible for an external user to make an inference with respect to the certification value SQ1 or SQ2 of the duplicate determination module.

Figure 15:
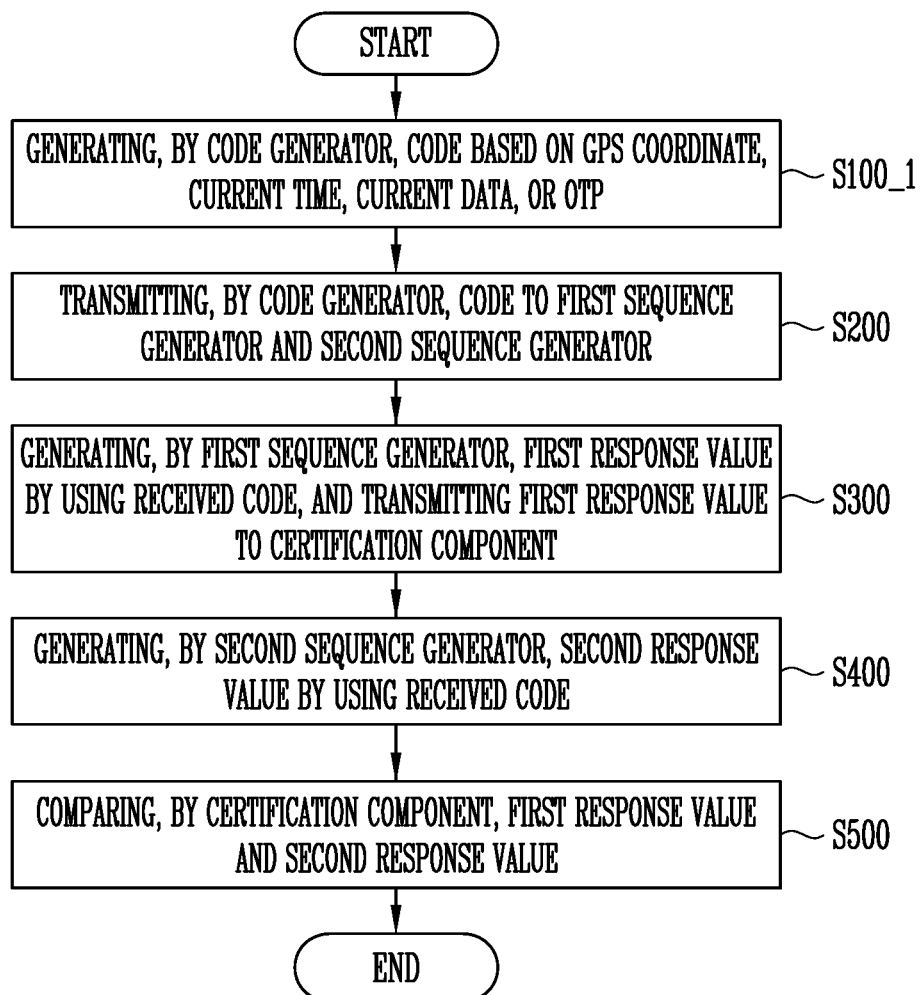
FIG. 15 is a flowchart illustrating a method for determining duplication of the display panel of the electronic device according to another embodiment of the present disclosure.

FIG. 15 is a flowchart illustrating a method for determining whether or not the display panel 20 of the electronic device 1 is a duplicate according to another embodiment of the present disclosure.

Referring to FIG. 15, the method according to this embodiment is different from the method illustrated in FIG. 4 in that a code is generated in a different manner in step S100_1.

The step S100_1 of generating a code according to this embodiment corresponds to a step in which the code generator 111 generates a code based on a GPS coordinate, a current time, a current data, or a one-time pad (OTP).

In some embodiments, the code generator may generate a code based on a GPS coordinate, a current time, a current data, or an OTP. For example, the generated code may include the above-described seed and the above-described number value N.

For example, a seed and a number value N may be generated by using a pre-arranged algorithm using numbers of respective ciphers, which are represented by the GPS coordinate, the current time, the current data, or the OTP.

An item selected and output from an i-bit binary matrix by using the seed and the number value N may be a random number (e.g., a near-true random number).

Figure 16:
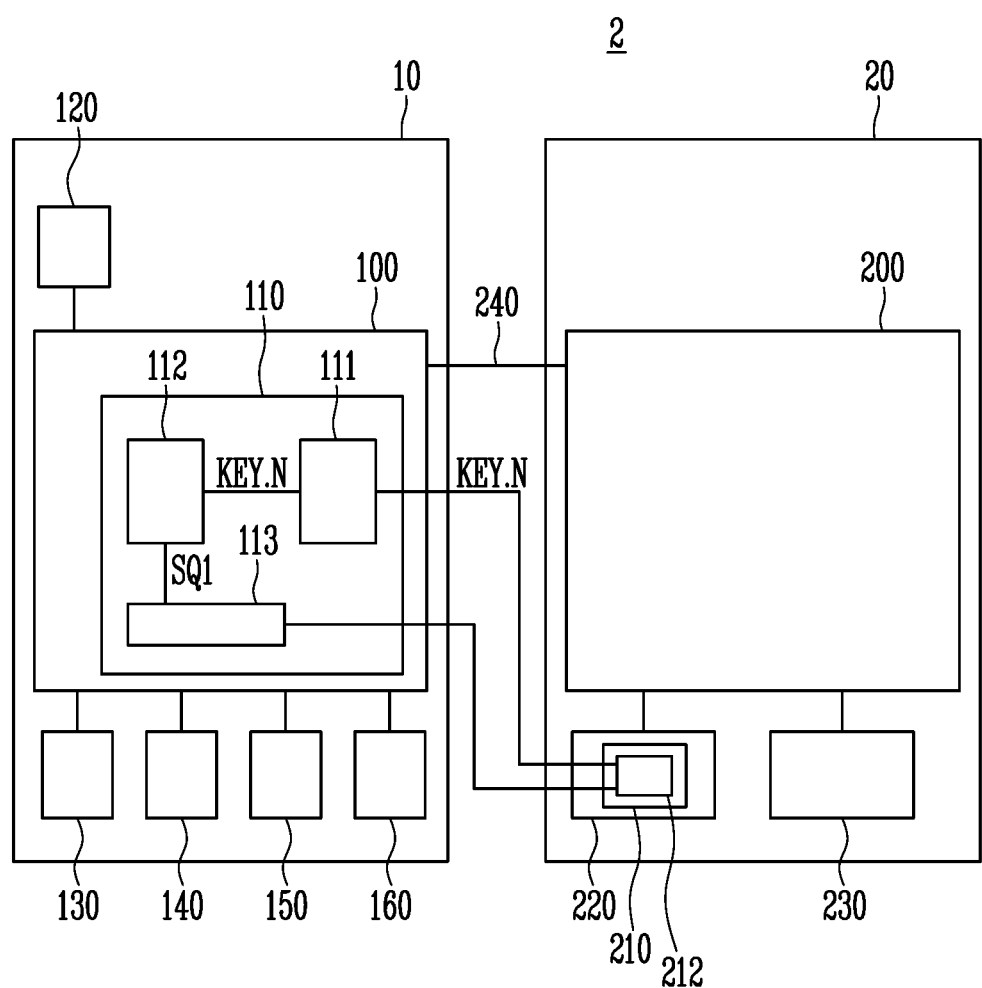
FIGS. 16 and 17 are block diagrams respectively illustrating electronic devices according to other embodiments of the present disclosure.
Figure 17:
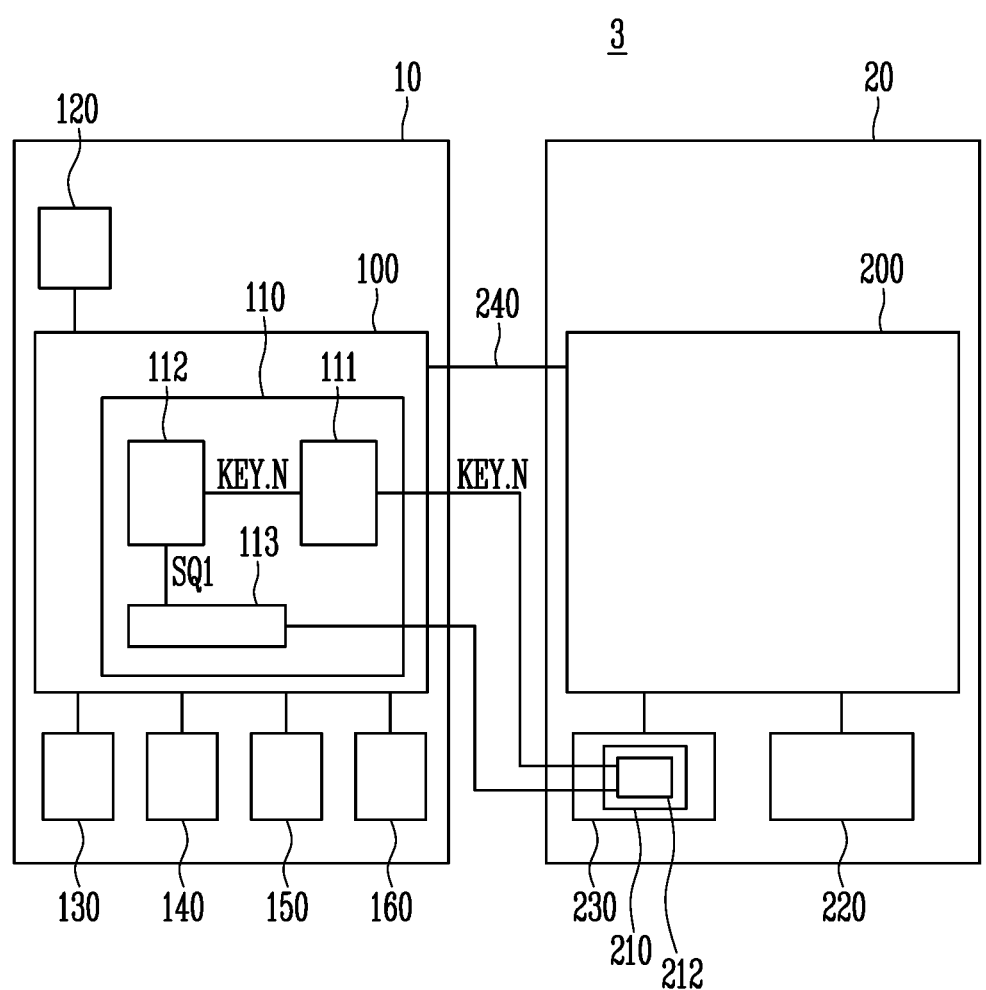

FIGS. 16 and 17 are block diagrams respectively illustrating electronic devices according to other embodiments of the present disclosure.

Referring to FIGS. 16 and 17, the electronic devices 2 and 3 according to these embodiments are different from the electronic device according to the embodiment described with respect to FIG. 3 in that the second duplicate determination module 210 in the display panel 20 is located at a different position.

According to these embodiments, the second duplicate determination module 210 may be located in the power controller 220 or the touch signal controller 230. Each of the power controller 220 and the touch signal controller 230 may be electrically connected to the driver IC 200 and the processor 100 in the electronic module 10 and, accordingly, may transmit/receive an electrical signal. For example, the power controller 220 and the touch signal controller 230 may be controlled by the driver IC 200 in the display panel 20 and/or the processor 100 in the electronic module 10.

Thus, the second duplicate determination module 210 is located in the power controller 220 or the touch signal controller 230 and is configured to perform the process of determining whether or not the display panel 20 is a duplicate, which is described above with reference to FIGS. 4-9.

However, the position of the second duplicate determination module 210 is not limited to those illustrated in the drawings. In another embodiment, the second duplicate determination module 210 may be interposed in (e.g., may be formed from) several components in the display panel 20, which can be substantially controlled by the processor 100, to perform the process of determining whether or not the display panel 20 is a duplicate.

According to embodiments of the present disclosure, it is virtually impossible to infer response values output by the method for determining whether or not the display panel is a duplicate.

Example embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those skilled in the art that various changes in form and details may be made without departing from the spirit and scope of the present disclosure as set forth in the following claims and their equivalents.

What is claimed is:

1. A method for determining whether or not a display panel mounted to a printed circuit board is a duplicate, the method comprising:
generating a code in a processor of the printed circuit board;
transmitting the code to a driver integrated circuit (IC) of the display panel;
generating a first response value in the processor;
generating a second response value in the driver IC and transmitting the second response value to the processor; and
comparing the first response value and the received second response value in the processor.

2. The method of claim 1, wherein the processor and the driver IC generate the first response value and the second response value by using a linear feedback shift register (LFSR).

3. The method of claim 2, wherein each item of a sequence generated by using the LFSR is a binary number having at least 16 bits.

4. The method of claim 2, wherein the code comprises a seed and a number value.

5. The method of claim 4, wherein a first item of a sequence generated by using the LFSR is generated by moving, to a first cipher of the seed, an output value obtained by inputting two ciphers selected from the seed to an exclusive OR gate, and deleting a last cipher of the seed.

6. The method of claim 5, wherein the first response value and the second response value correspond to an item selected according to the number value from among the items of the sequence generated by using the LFSR.

7. The method of claim 1, wherein each of the processor and the driver IC comprises a multiplexer.

8. The method of claim 7, wherein the multiplexer outputs a j-bit binary item by selecting at least two ciphers from an i-bit binary item,
wherein i is a natural number greater than or equal to 2, and
wherein j is smaller than i.

9. The method of claim 1, wherein the processor is configured to control the driver IC electrically connected thereto.

10. The method of claim 9, wherein, in the comparing, by the processor, the first response value and the received second response value, the processor controls the display panel to be operated when the first response value and the second response value are equal to each other, and controls the display panel to not be operated when the first response value and the second response value are different from each other.

11. The method of claim 1, further comprising, between the transmitting of the code and the comparing of the first response value and the received second response value, generating, by the driver IC, a password, and transmitting the password to the processor.

12. The method of claim 1, wherein the processor is configured to generate the code based on a GPS coordinate, a current time, a current data, or a one-time pad (OTP).

* * * * *